358-86. OR 3,130,265 SR
SEARCH ROOM

April 21, 1964 E. LEONARD 3,130,265

SIGNAL RECEIVING SYSTEM

Filed March 23, 1960 2 Sheets-Sheet 1

T5002
X5027

INVENTOR.
Eugene Leonard
BY
S.C. Yuter
ATTORNEY

INVENTOR.
Eugene Leonard
BY
ATTORNEY

United States Patent Office 3,130,265

Patented Apr. 21, 1964

3,130,265
SIGNAL RECEIVING SYSTEM

Eugene Leonard, Sands Point, N.Y., assignor to Digitronics Corporation, Albertson, N.Y., a corporation of Delaware Filed Mar. 23, 1960, Ser. No. 16,998
18 Claims. (Cl. 178—6)

This invention is related to signal receiving systems and more particularly to systems for monitoring a number of receivers to determine what each receiver is receiving.

Signal receiver monitoring systems have numerous applications in many fields such as telemetering, remote control, data processing, and television. In the television art, television receiver monitoring is employed both for the billing of toll television and community antenna programs and for the obtaining of statistical information concerning the popularity of particular television programs.

In the past, most television receiver monitoring systems have been highly complex and extremely expensive. The apparatus required to interrogate each television receiver required numerous interconnections between the receiver and the interrogating device. Such interconnections necessitated either the rewiring of the receiver or the installation of considerable auxiliary apparatus in close proximity to the television receiver, or both. Furthermore, each auxiliary unit required its own unique connection to a central station. This complexity which arises even for single television channel monitoring is greatly multiplied for multi-channel monitoring.

It is accordingly a general object of the invention to provide improved signal receiver monitoring apparatus.

It is another object of the invention to provide improved apparatus for indicating which of a plurality of groups of information signals is being received by a signal receiving means.

It is a further object of the invention to provide improved means for indicating which of a plurality of signal receivers is receiving information signals.

It is a specific object of the invention to provide improved television receiver monitoring apparatus which indicates which of a plurality of television channels is being received by each of a plurality of television receivers.

It is another general object of the invention to provide improved apparatus which while satisfying the above objects is simple, reliable and inexpensive.

Briefly, in accordance with one aspect of the invention, apparatus is provided for determining which of a plurality of groups of information signals is being received by a signal receiving means. Each of the groups of information signals include reference signals that have a phase which is different from the phases of the reference signals of the other groups of information signals. The apparatus includes means for monitoring the receiving means and means for sequentially transmitting to the monitoring means interrogating signals that are in phase with the differently phased reference signals. The monitoring means includes means for transmitting a signal when the received interrogating signal has a predetermined phase relationship with the reference signals received by the receiver.

In another aspect of the invention, apparatus is provided for determining which of a plurality of receivers is receiving information signals. The apparatus includes means for transmitting a sequential plurality of signals to each of a plurality of monitoring means. Each of the monitoring means is associated with one of the receivers. The monitoring means are interconnected so that only one operates in response to an interrogating signal and alerts another to be operative in response to the next occurring interrogating signal. Each monitoring means includes means for transmitting a signal when the monitoring means is operating provided the associated receiving means is receiving information.

In accordance with a general aspect of the invention, both of these aspects are combined in a single system.

Other objects, features and advantages of the invention will be apparent from the following detailed description of the invention when read with the accompanying drawings wherein.

Figure 1:
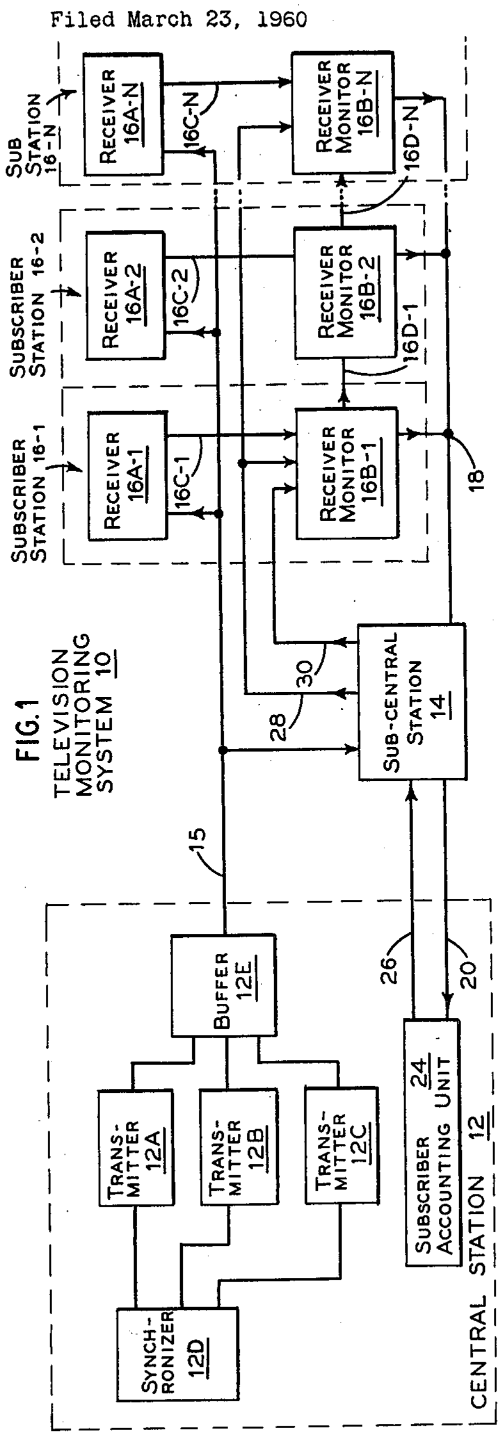
FIGURE 1 is a block diagram of a television monitoring system including a central station, a sub-central station, and a plurality of subscriber stations each having a receiver and a receiver monitor in accordance with the invention.

Referring to FIGURE 1, a television monitoring system 10 is shown comprising a central station 12, a sub-central station 14 and a plurality of subscriber stations 16–1 to 16–N.

Central station 12 transmits simultaneously on different channels television signals representing different programs via coaxial cable 15 to sub-central station 14 and subscriber stations 16–1 to 16–N. The channels employed may be the conventional channels 2 to 13 and the television signals include the conventional, horizontal and vertical sync pulses, the blanking pulses which may be considered reference signals, as well as the audio and video signals. The sole requirement for the television signals is that either one of the sync pulses or the blanking pulses of each channel are out of phase with the similar pulses of the other channels.

For example, consider the horizontal sync pulses. Horizontal sync pulses on a channel are separated in time by about 67 microseconds. If three channels are carried by coaxial cable 15, then the horizontal sync pulses of the second channel may be set to occur about twenty-two microseconds after the horizontal sync pulses of the first channel, and that the horizontal sync pulses of the third channel may be set to occur about twenty-two microseconds after the horizontal sync pulses of the second channel. Of course, if more channels are used, the time separations between the horizontal sync pulses of the channels will be set to less.

By way of example, a three channel system will be described in detail. Accordingly, central station 12 (FIG. 1) includes three conventional television transmitters 12A, 12B and 12C, each transmitting on a different channel. The three synchronizing signals are generated by circuitry 12D which controls the relative phasing of the sync signals of the television transmitters 12A, 12B and 12C. Buffer 12E, such as Jerrold Mixing Network AMN, receives the signals from the three television transmitters 12A, 12B and 12C and transmits them simultaneously to the coaxial cable 15.

Each of the subscriber stations 16–1 to 16–N receives the television signals by receivers such as receiver 16A–1 which selects one of the channels for viewing. Receiver 16A–1 is a conventional television receiver with one modification. Detection means are included in the receiver to detect the horizontal sync pulses being received. This detection means may be a simple radiation pickup device or a capacitor coupled to the horizontal output tube of the receiver. The detected horizontal sync pulses are transmitted via line 16C–1 to the receiver monitor 16B–1. At predetermined times, as is hereinafter described, the detected horizontal sync pulses are transmitted as reply pulses from the receiver monitor 16B–1 via line 18 to sub-central station 14 for identification. Sub-central station 14 transmits identification signals via line 20 to a subscriber accounting unit 24 in central station 24 as is hereinafter described.

It should be noted that two units of information identify the program a subscriber is watching, which subscriber is being interrogated and what channel the subscriber is watching. Sub-central station 14 cooperating with receiver monitors 16B–1 to 16B–N acting as a step counter provide the required information as hereinafter described.

Sub-central station 14 in response to a channel select signal received from central station 12 via line 26 is tuned to select the carrier signal of one of the channels being transmitted via coaxial cable 15. In response to the horizontal sync pulses which are derived from the selected carrier information, sub-central station 14 transmits stepping and interrogating pulses via line 28 to receiver monitors 16B–1 to 16B–N. The stepping and interrogating pulses occur in phase with the received horizontal sync pulses. Prior to the first stepping pulse, in response to the channel select signal, an initial clear signal is transmitted from sub-central station 14 via line 30 to set receiver monitor 16B–1 and reset receiver monitors 16B–2 to 16B–N.

The first stepping pulse causes receiver monitor 16B–1 to be set to sample for the presence of a detected horizontal sync pulse on line 16C–1. If receiver 16A–1 is tuned to the first channel, a reply or indicating pulse will be transmitted from receiver monitor 16B–1 to line 18 during the next stepping pulse. If receiver 16A–1 is not operating or is tuned to the second or third channel, no reply pulse is transmitted. The first stepping pulse resets receiver monitor 16B–1 which generates an alerting signal that is transmitted via line 16D–1 to alert receiver monitor 16B–2. The second stepping pulse which had sampled receiver monitor 16B–1 also causes receiver monitor 16B–2 to be set to sample for the presence of a detected horizontal sync pulse on line 16C–2 when the third stepping pulse occurs. If receiver 16A–2 is not operating or is tuned to the second or third channel, no reply pulse is transmitted. The second stepping pulse resets receiver monitor 16B–1 which generates an alerting signal that is transmitted via line 16D–2 to alert receiver monitor 16B–3. A similar action now occurs for the remaining receiver monitors 16B–3 to 16B–N in sequential response to the stepping pulses.

After all receiver monitors 16B–1 to 16B–N have monitored their associated receivers for the first channel, another channel select signal is transmitted from central station 12 via line 26 causing sub-central station 14 to be tuned to receive horizontal sync pulses from the second channel. In response thereto, another initial clear signal is transmitted from sub-central station 14 via line 28 to set or alert receiver monitor 16B–1 and to insure that all other receiver monitors 16B–2 to 16B–N are reset. Sub-central station 14 now generates stepping pulses that are in phase with the horizontal sync pulses of the second channel.

In the same manner as previously described, each of the receivers 16A–1 to 16A–N is sequentially monitored to determine whether it is tuned to the second channel. After all the receivers 16A–1 to 16A–N have been interrogated for the second channel, sub-central station 14 receives another channel select signal and the sampling cycle for the third channel is initiated.

Figure 2:
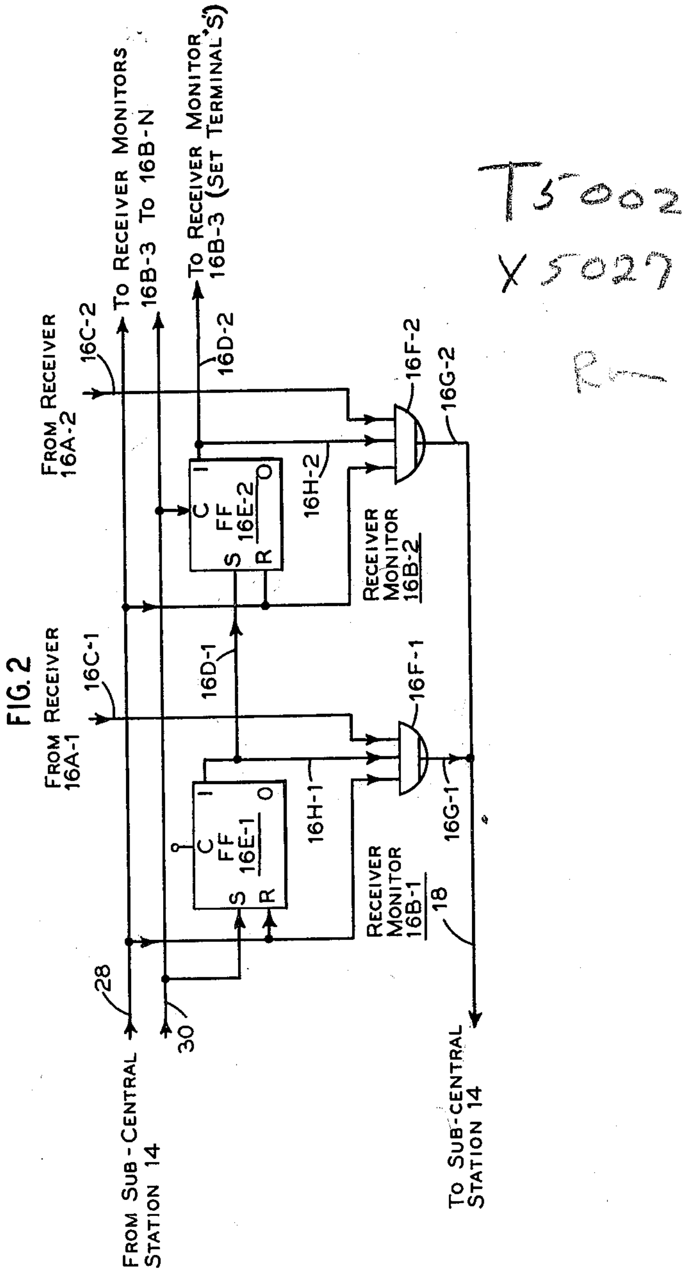
FIGURE 2 is a block diagram of two of the interconnected receiver monitors of FIGURE 1.

In order to more fully understand the sampling and stepping action of the receiver monitors 16B–1 to 16B–N, reference is made to FIGURE 2 which shows receiver monitors 16B–1 and 16B–2. The receiver monitor 16B–1 comprises a flip flop 16E–1, and an "and" circuit 16F–1. Flip flop 16E–1, hereinafter more fully described, has a set input terminal "S," a reset input terminal "R," a clear terminal "C," and a set output terminal "1" and a reset output terminal "O."

The positive-going edge of a pulse received at the set input terminal "S" causes flip flop 16E-1 to set, causing the generation of a negative-going voltage from the set output terminal "1" and a positive-going voltage from the reset output terminal "O." The positive-going edge of a pulse received at the reset terminal "R" causes flip flop 16E–1 to reset and interchange the polarities of the voltages at the output terminals. "And" circuit 16F–1, hereinafter more fully described, transmits a negative-going signal from its output terminal 16G–1 when negative-going signals or pulses are simultaneously present on all of its input terminals.

Set terminal "S" of flip flop 16E–1 is coupled to line 30 and, during the end of the initial clear pulse transmitted from sub-central station 14, flip flop 16E–1 sets and a negative (or enabling) voltage is present on line 16H–1. When the first stepping pulse is transmitted on line 28, the gate 16F–1 is enabled and becomes dependent only on the voltage on line 16C–1. If a negative pulse is present on line 16C–1 at this time indicating that receiver 16A–1 is receiving horizontal sync pulses in phase with those of the channel being monitored, a pulse is passed via line 18 to sub-central station 14. This stepping pulse is also received at reset terminal "R" of flip flop 16E–1, resetting the flip flop with its trailing edge. This reset causes a positive going voltage transition at 16D–1 which sets flip flop 16E–2.

Receiver monitor 16B–2, which is similar to the remaining receiver monitors 16B–3 to 16B–N, comprise flip flop 16E–2 and "and" circuit 16F–2. Flip flop 16E–2 is similar to flip flop 16E–1.

During the initial clear pulse on line 30, flip flop 16E–2 is reset via clear terminal "C" and remains reset until the occurrence of the first stepping pulse. The occurrence of the first stepping pulse on line 28 causes reset of flip flop 16E–1 as previously described.

The reset of flip flop 16E–1 causes a positive-going voltage transition at the set output terminal "1" of flip flop 16E–1 which, when coupled to the set input terminal "S" of flip flop 16E–2, causes flip flop 16E–2 to set.

When the second stepping pulse is present on line 28, the voltage on line 16C–2 is sampled, and if receiver 16A–2 is tuned to the channel being monitored, "and" circuit 16F–2 transmtis the horizontal sync pulse to line 18. During the occurrence of the second stepping pulse, flip flop 16E–2 resets. The flip flop associated with receiver monitor 16B–3 sets during the occurrence of the second stepping pulse in the same way that the flip flop 16E–2 sets during the occurrence of the first stepping pulse. In this manner receiver monitors 16B–1 to 16B–N sequentially sample their associated receivers 16A–1 to 16A–N.

Figure 3:
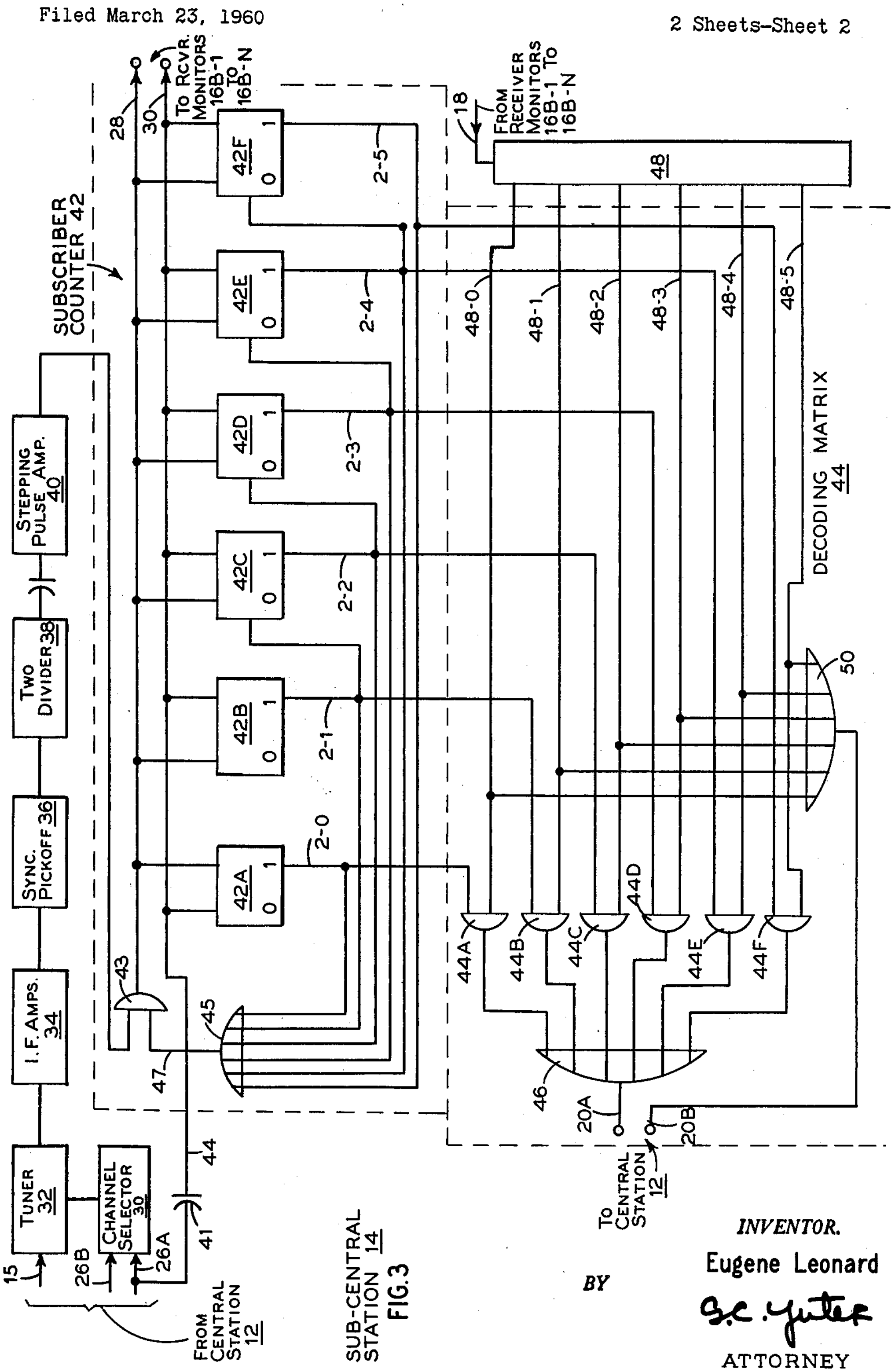
FIGURE 3 is a block diagram of the sub-central station of FIGURE 1.

FIGURE 3 shows the sub-central station 14 which generates the stepping pulses and the initial clear pulse and receives the reply pulses.

Channel select signals are received from central station 12 via line 26. Channel selector 30 may be a rotary solenoid mechanically coupled to a conventional television tuner 32. The rotary solenoid steps one position per pulse received via line 26A and can be returned to the first channel position after the last channel is scanned. Each time a channel select signal is received, the television tuner 32 is switched to a new channel. The television signals are received from coaxial cable 15 and after frequency conversion, are amplified by the I.F. amplifiers 34. The horizontal sync pulses are passed by the conventional sync pick-off 36 to a conventional two divider 38. Two divider 38 may be a conventional binary counter that transmits one pulse for each two pulses received. In many installations, two divider 38, which permits the passage of alternate horizontal sync pulses, may not be required. If only alternate horizontal sync pulses are selected for stepping pulses, then the subscriber stations 16–1 to 16–N may be displaced from the sub-central station 14 up to about ten miles. If every horizontal sync pulse is employed for a stepping pulse, the distance is about five miles. The distance is controlled by the transit time for a stepping pulse to reach the most remote subscriber station and for the reply pulse to be received from that subscriber station by the sub-central station 14. The round trip transit time must be less than the period between successive stepping pulses.

In any event, the horizontal sync pulses are transmitted from two divider 38 to stepping pulse amplifier 40, a conventional pulse amplifier. The amplified horizontal sync pulses are transmitted from stepping pulse amplifier 40 to line 28 as stepping pulses.

Subscriber counter 42 counts the stepping pulses. It will be recalled that the first stepping pulse causes the sampling of the receiver 16A–1 of subscriber station 16–1, the second stepping pulse causes the sampling of the receiver 16A–2 of subscriber unit 16–2, etc. Accordingly, the subscriber counter 42, by accumulating a count of the stepping pulses, provides an identification of the reply pulses from the subscriber units 16–1 to 16–N.

Subscriber counter 42 can be a plurality of cascaded binary counters having a maximum count equal to the number of subscriber stations 16–1 to 16–N. For example, assume there are sixty-two subscriber units. Therefore, subscriber counter 42 will have six binary counter stages. The cascaded binary counter stages are so arranged that when the count goes from sixty-three to sixty-four (zero), the counters lock up and are not responsive to any further stepping pulses. However, for any count less than sixty-four, the cascaded binary counters are responsive to stepping pulses. The only other provision imposed on the cascaded binary counters is the ability in response to a clear signal to be set to register the count of one.

Whenever the channel select signal is received on line 26 from central control 12 it, in addition to activating the channel selector 30, provides an initial clear signal which is transmitted via line 44 to the initial clear terminal of subscriber counter 42 to preset it to a count of one. The initial clear signal is also transmitted via line 30 to preset the receiver monitors 16B–1 to 16B–N so that receiver monitor 16B–1 is alerted and the remaining receiver monitors 16B–2 to 16B–N are reset as previously described.

Each binary counter 42A to 42E of subscriber counter 42 has a set output terminal "1" coupled via one of the lines 2–0, 2–1, 2–2, 2–3, 2–4, 2–5 respectively to decoding matrix 44. It should be noted that the second digit of each reference character 2–0, 2–1, 2–2, 2–3, 2–4 and 2–5 indicates the power of two generated by the associated binary counter. For example, when the sixty-third stepping pulse has been counted, there will be negative voltages present on each of the lines 2–0, 2–1, 2–2, 2–3, 2–4 and 2–5.

Decoding matrix 44 comprises six two-input "and" circuits 44A to 44F with output terminals connected to input terminals of "or" circuit 46. The first input terminals of the "and" circuits 44A to 44F are respectively coupled to the lines 2–0 to 2–5. The second input terminals of the "and" circuits 44A to 44F are respectively coupled to the lines 48–0 to 48–5 coupled to delay means 48. Delay means 48 may be, for example, an electrical delay line having six taps displaced along the delay line, each tap being connected to one of the lines 48–0 to 48–5. When a reply pulse is received on line 18, it enters delay means 48 which transmits six pulses serially displaced in time, each pulse appearing on one of the lines 48–0 to 48–5. The pulses probe the respective "and" circuits 44A to 44F in decoding matrix 44 which have their second input terminals coupled to the lines 48–0 to 48–5. Each "and" circuit 42A to 42F which has a negative voltage at its first input terminal coupled to one of the lines 2–0 to 2–5 will transmit a pulse to an input terminal of "or" circuit 46, which in turn transmits a serial six position pulse-no pulse combination to line 20A.

For example, when subscriber counter 42 has attained a count of sixty-three, six pulses in series will be transmitted along line 20A in response to the receipt of a reply pulse by delay means 48. The presence of the six pulses indicates that subscriber station 16–32 is viewing the channel being sampled. In order to facilitate the reading of the six position coded pulse-no pulse combination by the subscriber accounting unit 24 of central station 12, sprocket pulses may be transmitted on line 20B in parallel with the combination. The sprocket pulses are received from "or" circuit 50 which has six input terminals respectively coupled to the lines 48–0 to 48–5.

Subscriber accounting unit 24 may include means such as a magnetic tape unit to record the coded combinations of pulses received. At a later time the magnetic tape may be read and the information recorded thereon processed to provide billing and/or statistical information.

Subscriber accounting unit 24 may also include a pair of switches for generating the homing and channel select pulses transmitted via lines 26A and 26B to sub-central station 14. Of course, in an all electronic system such switches would be of the electronic type.

APPENDIX

The "and" circuits and "or" circuits may be similar to those shown and described in the section entitled "The Basic 'And' and 'Or' Circuits" on page 37 of the book, Digital Computer Components and Circuits by R. K. Richards, published by D. Van Nostrand Company, Inc. in 1957. The flip flop may be similar to that shown and described in the copending application of E. Leonard et al. for Transistor Switching Circuit, Serial No. 835,903, filed August 25, 1959.

A suitable binary counter is shown on page 328 of the book entitled, "Pulse and Digital Circuits" by Millman and Taub, published by McGraw-Hill in 1956.

Of course, these circuits are disclosed by way of example, since anyone skilled in the art is aware of other circuits or modifications of these circuits which perform equally well the required logical functions.

There has thus been shown improved signal receiver monitoring apparatus which, by virtue of employing interrogating signals in phase with the reference signals received by the signal receivers, permits the identification of which of a plurality of groups of information is being received by a receiver. Furthermore, since the apparatus includes interconnected receiver monitors, simple and inexpensive means are provided for indicating which of a plurality of receivers is receiving information.

There will now be obvious to those skilled in the art many modifications and variations utilizing the principles set forth and realizing many or all of the objects and advantages, but which do not depart essentially from the spirit of the invention.

What is claimed is:

1. Apparatus for indicating which of a plurality of groups of information signals is being received by a receiving means, each of said groups of information signals including reference signals, the phase of the reference signals of each of said groups being different from the phase of the reference signals of the others of said groups, said apparatus comprising monitoring means for monitoring said receiving means, interrogating signal means for sequentially transmitting to said monitoring means interrogating signals that have predetermined phase relationships with the reference signals of said groups of information signals, phase sensing means included in said monitoring means for sensing for a predetermined phase relationship between said interrogating signals and said reference signals and for transmitting an indicating signal when the interrogating signal received by said monitoring means has a predetermined phase relationship with the reference signal received by said receiving means, and means for receiving said indicating signals for registering which of said plurality of groups of information signals is being received by said receiving means.

2. Apparatus for indicating which of a plurality of groups of information signals is being received by a receiving means, each of said groups of information signals including reference signals, the phase of the reference signals of each of said groups being different from the phase of the reference signals of the others of said groups, said apparatus comprising monitoring means for monitoring said receiving means, interrogation signal means responsive to said groups of information signals for transmitting to said monitoring means at any instant of time interrogating signals in phase with the reference signals of one of said groups of information signals, means for controlling said interrogating means to sequentially transmit interrogating signals that are in phase with the reference signals of said groups of information signals, phase coincidence means included in said monitoring means for sensing for phase coincidence between said interrogating signals and said reference signals and for transmitting an indicating signal when the interrogating signal received by said monitoring means is in phase with the reference signal received by said receiving means, and means for receiving said indicating signals for registering which of said plurality of groups of information signals is being received by said receiving means.

3. Apparatus for indicating which of a plurality of groups of information signals is being received by a signal receiver, the groups of information signals including reference signals, the phase of the reference signals associated with each of said groups of information signals being different than the phase of the reference signals of the other groups of information signals, comprising interrogating signal means for receiving all of said groups of information signals, means for causing said interrogating signal means to sequentially select the reference signals of each of said groups of information signals and transmit the selected reference signals as interrogating signals, phase coincidence means responsive to said signal receiver and said interrogating signal means for sensing for phase coincidence between said interrogating signals and said reference signals and to transmit an indicating signal when the interrogating signals received by said monitoring means are in phase with the reference signals received by said receiving means, and means for receiving said indicating signals for registering which of said plurality of groups of information signals is being received by said receiving means.

4. Apparatus for indicating which of a plurality of television channels is being received by a television receiver, the signals being carried by said television channels including synchronizing signals and audio and video signals, the phase of the synchronizing signals on each of said television channels being different than the phase of the synchronizing signals of the other television channels, comprising interrogating signal means for receiving all of said television channels, means for causing said interrogating signal means to sequentially select the synchronizing signals of each of said channels and transmit the selected synchronizing signals as interrogating signals, and phase sensing means responsive to said television receiver and said interrogating signal means for sensing for phase coincidence between said interrogating signals and said synchronizing signals and to transmit indicating signals when the interrogating signals received by said monitoring means are in phase with the synchronizing signals received by said receiving means to indicate which of said television channels is being received by said television receiver.

5. Apparatus for indicating which of a plurality of receiving means are receiving information comprising a plurality of serially connected monitoring means, each of said monitoring means monitoring one of said receiving means, means for generating a sequential plurality of interrogating signals, means for transmitting to said plurality of monitoring means the sequential plurality of interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, means included in each of said monitoring means for transmitting an indicating signal when the monitoring means is operating provided the associated receiving means is receiving information, and means for receiving the indicating signals.

6. Apparatus for indicating which of a plurality of receiving means are receiving information comprising a plurality of serially connected monitoring means, each of said monitoring means for monitoring one of said receiving means, means for generating periodically occurring signals related to the information, means for transmitting to said plurality of monitoring means the periodically occurring interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, means included in each of said monitoring means for transmitting an indicating signal when the monitoring means is operating provided the associated receiving means is receiving information, and means for receiving the indicating signals.

7. Apparatus for indicating which of a plurality of groups of information signals is being received by each of a plurality of receiving means, each of said groups of information signals including reference signals, the phase of the reference signals of each group being different from the phase of the reference signals of the other groups, comprising interrogating signal means for transmitting sequentially groups of interrogating signals that are in phase with the reference signals of said groups of information signals, a plurality of serially connected monitoring means, each of said monitoring means monitoring one of said receiving means, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, phase sensing means included in each of said monitoring means for sensing for the phase relation between said interrogating signals and said reference signals and for transmitting an indicating signal when the reference signals being received by its associated receiver are in phase with the interrogating signals rendering said monitoring means responsive to said receiving means, and means for receiving said indicating signals.

8. Apparatus for indicating which of a plurality of groups of information signals is being received by each of a plurality of receiving means, each of said groups of information signals including reference signals, the phase of the reference signals of each group being different from the phase of the reference signals of the other groups, comprising interrogating signal means for transmitting sequentially groups of interrogating signals that are in phase with the reference signals of said groups of information signals, there being in each sequential group at least a number of sequentially occurring interrogating signals all of the same phase equal to the number of said plurality of receiving means, there also being at least a number of said sequentially occurring groups equal to the number of groups of information signals, a plurality of serially connected monitoring means, each of said monitoring means monitoring one of said receiving means, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, phase sensing means included in each of said monitoring means for sensing for the phase relation between said reference signals and said interrogating signal and to transmit an indicating signal when the reference signals being received by its associated receiver are in phase with the interrogating signals rendering said monitoring means responsive to said receiving means, and means for receiving said indicating signals.

9. Apparatus for indicating which of a plurality of television channels is being received by each of a plurality of television receivers, each of said television channels carrying signals including reference signals, the phase of the reference signals in each television channel being different from the phase of the reference signals in the other channels, comprising interrogating signal means for transmitting sequentially groups of interrogating signals that are in phase with the reference signals of said television channels, a plurality of serially connected monitoring means, each of said monitoring means monitoring one of said television receivers, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, and phase sensing means included in each of said monitoring means for sensing for the phase relation between said interrogating signals and said reference signals and to transmit an indicating signal when the reference signals being received by its associated television receiver are in phase with the interrogating signals rendering said monitoring means responsive to said receiving means.

10. Apparatus for indicating which of a plurality of groups of information signals is being received by each of a plurality of receiving means, each of said plurality of groups of information signals including reference signals, the phase of the reference signals of each group being different from the phase of the reference signals of the other groups, comprising interrogating signal means for receiving all the groups of information signals, means for causing said interrogating signal means to sequentially select groups of reference signals of each of said groups of information signals and transmit the selected groups of reference signals as groups of interrogating signals, a plurality of serially connected monitoring means, each of said monitoring means monitoring one of said receiving means, means for transmitting to said monitoring means said groups of interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, phase sensing means included in each of said monitoring means for sensing for phase coincidence between said interrogating signals and said reference signals and for transmitting an indicating signal when the monitoring means is rendered operative by an interrogating signal having the same phase as the reference signals being received by its associated receiving means, and means for receiving said indicating signals.

11. Apparatus for indicating which of a plurality of groups of information signals is being received by each of a plurality of receiving means, each of said plurality of groups of information signals including reference signals, the phase of the reference signals of each group being different from the phase of the reference signals of the other groups, comprising interrogating signal means for receiving all the groups of information signals, means for causing said interrogating signal means to sequentially select groups of reference signals of each of said groups of information signals and transmit the selected groups of reference signals as groups of sequential interrogating signals, each of said groups of interrogating signals including a number of same-phased signals at least equal to the number of receiving means and the number of groups of interrogating signals being equal at least to the number of groups of serially connected information signals, a plurality of monitoring means, each of said monitoring means monitoring one of said receiving means, means for transmitting to said monitoring means said groups of interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, sensing means included in each of said monitoring means for sensing for coincidence between said interrogating signals and said reference signals and for transmitting an indicating signal when the monitoring means is rendered operative by an interrogating signal having the same phase as the reference signals being received by its associated receiver, and means for receiving said indicating signals.

12. Apparatus for indicating which of a plurality of television channels is being received by each of a plurality of television receivers, each of said plurality of television channels carrying, in addition to video and audio signals, synchronizing signals, the phase of the synchronizing signals of each group being different from the phase of the synchronizing signals of the other groups, comprising interrogating signal means for receiving all the television channels, means for causing said interrogating signal means to sequentially select groups of synchronizing signals of each of said television channels and transmit the selected groups of synchronizing signals as groups of interrogating signals, each of said group of interrogating signals including a number of same-phase signals at least equal to the number of television receivers and the number of groups of interrogating signals being equal at least to the number of television channels, a plurality of serially connected monitoring means, each of said monitoring means monitoring one of said television receivers, means for transmitting to said monitoring means said groups of interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, sensing means included in each of said monitoring means for sensing for phase coincidence between interrogating signals and synchronizing signals and for transmitting an indicating signal when the monitoring means is rendered operative by an interrogating signal having the same phase as the synchronizing signals being received by its associated television receiver, and means for receiving said indicating signals.

13. Apparatus for indicating which of a plurality of receiving means is receiving information signals, said information signals including reference signals, interrogating signals for receiving the information signals and selecting the reference signals for transmission as interrogating signals, the number of interrogating signals being at least equal to the number of receiving means, memory means included in said interrogating means to remember at each instant the number of interrogating signals that has been transmitted, a plurality of serially connected monitoring means, each of said monitoring means monitoring one of said receiving means, means for transmitting to said monitoring means said interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, means included in each of said monitoring means for transmitting a reply signal when the monitoring means is rendered operative by an interrogating signal and reference signals are being received by its associated receiving means, and means responsive to said reply signal and said memory means for transmitting a coded combination of signals for identifying the monitoring means that transmitted said reply signal.

14. Apparatus for indicating which of a plurality of groups of information signals is being received by each of a plurality of receiving means, each of said groups of information signals including reference signals, the phase of the reference signals of each group being different from the phase of the reference signals of the other groups, comprising interrogating signal means for receiving all the groups of information signals, means for causing said interrogating signal means to select groups of reference signals of each of said groups of information signals and transmit the selected groups of reference signals as groups of interrogating signals, each of said groups of interrogating signals including a group of same-phased signals at least equal in number to the number of receiving means and the groups of interrogating signals being at least equal in number to the number of groups of information signals, memory means included in said interrogating means to remember at each instant the number of interrogating signals that has been transmitted in the group of interrogating signals being transmitted, a plurality of serially connected monitoring means, each of said monitoring means monitoring one of said receiving means, means for transmitting to said monitoring means said groups of interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, phase sensing means included in each of said monitoring means for sensing for phase coincidence between interrogating signals and reference signals or for transmitting a reply signal when the monitoring means is rendered operative by an interrogating signal having the same phase as the reference signals being received by its associated receiving means, and means responsive to said reply signal and said memory means for transmitting a coded combination of signals for identifying the monitoring means that transmitted said reply signal.

15. Apparatus for indicating which of a plurality of television channels is being received by each of a plurality of television receivers, each of said television channels carrying, in addition to video and audio signals, synchronizing signals, the phase of the synchronizing signals of each television channel being different from the phase of the synchronizing signals of the other television channels, comprising interrogating signal means for receiving all the television channels, means for causing said interrogating signal means to select groups of synchronizing signals of each of said television channels and transmit the selected groups of synchronizing signals as groups of interrogating signals, each of said groups of interrogating signals including a group of same-phased signals at least equal in number to the number of television receivers and the groups of interrogating signals being at least equal in number to the number of television channels, means included in said interrogating means to remember at each instant the number of interrogating signals that has been transmitted in the group being transmitted, a plurality of serially connected monitoring means, each of said monitoring means monitoring one of said television receivers, means for transmitting to said monitoring means said groups of interrogating signals, means included in each but the last of said serially connected monitoring means for transmitting an alerting signal to the succeeding monitoring means when said monitoring means is operative, means including in each but the first of said serially connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, phase sensing means included in each of said monitoring means for sensing for phase coincidence between interrogating signals and synchronizing signals and for transmitting a reply signal when the monitoring means is rendered operative by an interrogating signal having the same phase as the synchronizing signals being received by its associated television receiver, and means responsive to said reply signal and said memory means for transmitting a coded combination of signals for identifying the monitoring means that transmitted said reply signal.

16. Apparatus for indicating which of a plurality of selecting means is making a selection comprising a plurality of serially-connected monitoring means, each of said monitoring means monitoring one of said selecting means, means for generating periodically-occurring interrogating signals, means for transmitting to said plurality of monitoring means the periodically-occurring interrogating signals, means included in each but the last of said serially-connected monitoring means for transmitting an alerting signal to the succeeding monitoring means when said monitoring means is operative, means included in each but the first of said serially-connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, means included in each of said monitoring means for transmitting an indicating signal when the monitoring means is operating provided the associated selecting means is making a selection, and means for receiving the indicating signals.

17. Apparatus for indicating which of a plurality of selections is being made by each of a plurality of selecting means, said selecting means generating a different signal for each different selection, comprising interrogating signal means for transmitting sequentially groups of interrogating signals, a plurality of serially-connected monitoring means, each of said monitoring means monitoring one of said selecting means, means included in each but the last of said serially-connected monitoring means for transmitting an alerting signal to the succeeding monitoring means when said monitoring means is operative, means included in each but the first of said serially-connected monitoring means for causing said monitoring means to operate upon receipt of the alerting signal from the preceding monitoring means and an interrogating signal, means included in each of said monitoring means for returning said monitoring means to an inoperative state after receipt of an interrogating signal while being operative, signal sensing means included in each of said monitoring means for sensing for the different signals generated by said selecting means and transmitting an indicating signal when said selecting means is generating a signal at the time the interrogating signal renders said monitoring means responsive to said selecting means, and means for receiving said indicating signals.

18. Apparatus for indicating which of a plurality of selections is being made by each of a plurality of selecting means, each of said selecting means generating a different kind of selection signal for each selection made, comprising interrogating signal means for transmitting sequentially groups of interrogating signals that are related to the different kinds of selection signals generated by said selection means, a plurality of serially-connected monitoring means, each of said monitoring means monitoring one of said selecting means means included in each but the last of said serially-connected monitoring means for transmitting an alerting signal to the succeeding monitoring means when said monitoring means is operative, means included in each but the first of said serially-connected monitoring means for causing said monitoring means to operate upon receipt of the altering signal from the preceding monitoring means and an interrogating signal, means included in each of said monitoring means for returning said monitoring means to an inoperative state after receipt of an interrogating signal while being operative, signal coincidence means included in each of said monitoring means to transmit an indicating signal when the selection signal generated by its associated selection means is present at the time the interrogating signals render said monitoring means responsive to said selection means, and means for receiving said indicating signals.

References Cited in the file of this patent

UNITED STATES PATENTS

| | | |
|---|---|---|
| 2,188,165 | Thomas | Jan. 23, 1940 |
| 2,757,226 | Zworykin | July 31, 1956 |
| 2,854,506 | Pickles | Sept. 30, 1958 |
| 2,903,508 | Hathaway | Sept. 8, 1959 |
| 2,996,580 | Reid | Aug. 15, 1961 |
| 3,078,337 | Shanahan | Feb. 19, 1963 |